United States Patent
Cappello et al.

(10) Patent No.: US 11,702,605 B2
(45) Date of Patent: Jul. 18, 2023

(54) PLANT AND METHOD FOR THE PRODUCTION OF HYDROGEN WITH THE USE AND STORAGE OF CO2 USING FUELS

(71) Applicant: BLUEREVO IP B.V., Heerenveen (NL)

(72) Inventors: Giovanni Cappello, Galbiate (IT); Dennis Alexander Ross Morrey, Hackettstown, NJ (US); Valdis Bisters, Mārupe (LV); Juris Kalviss, Jekabpils Novads (LV)

(73) Assignee: BLUEREVO IP B.V., Heerenveen (NL)

( * ) Notice: Subject to any disclaimer, the term of this patent is extended or adjusted under 35 U.S.C. 154(b) by 0 days.

(21) Appl. No.: 17/794,728

(22) PCT Filed: Jan. 21, 2021

(86) PCT No.: PCT/IB2021/050453
§ 371 (c)(1),
(2) Date: Jul. 22, 2022

(87) PCT Pub. No.: WO2021/148976
PCT Pub. Date: Jul. 29, 2021

(65) Prior Publication Data
US 2023/0061251 A1    Mar. 2, 2023

(30) Foreign Application Priority Data
Jan. 22, 2020   (IT) .......................... 102020000001111

(51) Int. Cl.
*C10J 3/14*    (2006.01)
*B01D 53/46*   (2006.01)
(Continued)

(52) U.S. Cl.
CPC ................ *C10J 3/14* (2013.01); *B01D 53/46* (2013.01); *C10B 3/02* (2013.01); *C10K 1/003* (2013.01)

(58) Field of Classification Search
CPC ... C10J 3/14; B01D 53/46; C10B 3/02; C10K 1/003
(Continued)

(56) References Cited

U.S. PATENT DOCUMENTS

2009/0214408 A1   8/2009 Blake et al.
2011/0217227 A1   9/2011 Engsl et al.

FOREIGN PATENT DOCUMENTS

GB   2522015 A    7/2015
WO   0121735 A1   3/2001

OTHER PUBLICATIONS

International Search Report dated May 3, 2021, in corresponding to International Application No. PCT/IB2021/050453; 3 pages.
(Continued)

*Primary Examiner* — Douglas B Call
(74) *Attorney, Agent, or Firm* — Maier & Maier, PLLC (57) ABSTRACT

A plant and a method for the production of hydrogen and bicarbonate. The plant includes a gasifier, a reformer, a direct contact exchanger and an apparatus for the production of bicarbonate. The plant is suitable for receiving fuel, oxygen, water, carbonate, brine at the inlet and for producing hydrogen, bicarbonate and calcium chloride at the outlet. The plant uses a self-cleaning direct contact heat exchanger to cool the syngas downstream of the reformer and to produce the superheated steam that feeds the gasifier: this heat exchanger allows the production of hydrogen at low costs and in modular plants.

7 Claims, 3 Drawing Sheets

(51) Int. Cl.
*C10B 3/02* (2006.01)
*C10K 1/00* (2006.01)

(58) Field of Classification Search
USPC .......................................................... 252/373
See application file for complete search history.

(56) References Cited

OTHER PUBLICATIONS

Written Opinion of the International Searching Authority dated May 3, 2021, in corresponding to International Application No. PCT/IB2021/050453; 5 pages.

PLANT AND METHOD FOR THE PRODUCTION OF HYDROGEN WITH THE USE AND STORAGE OF CO2 USING FUELS

FIELD

The subject of the present invention is a method and a system for the production of hydrogen with storage of $CO_2$ using fuels.

BACKGROUND

The effects of the so-called "greenhouse gases" on the climate have long been known and above all the correlation between the concentration in the atmosphere of $CO_2$ (carbon dioxide or even carbon dioxide) and global warming.

The efforts of the world scientific and political community in recent years have been focused on trying to counter the increase in greenhouse gas emissions into the atmosphere, to avoid the phenomenon of global warming, that is, the increase in the average temperature at a global level.

In a known way, many initiatives aimed at limiting $CO_2$ emissions into the atmosphere have been promoted at an international level: among others, the Kyoto Protocol in 1997 and the Paris Agreement in 2015 deserve to be mentioned.

The forms identified by the scientific community to avoid global warming are many and substantially concern the decrease in the use of fossil fuels such as coal, oil and natural gas favoring the development of renewable energies such as hydraulic, wind, solar, biomass and of zero-emission fuels such as hydrogen or ammonia.

Furthermore, many efforts of the international community are focused on improving energy efficiency, as in the case of lighting with low consumption lamps, on transport with new generation of high efficiency motors and, in the context of electricity generation, towards the replacement of old and inefficient coal or fuel oil plants with new combined cycle plants with gas turbine and steam turbine, with energy yields close to 60%.

Despite the technological effort underway in the most advanced nations, the forecasts of well-known international institutions on the need for energy globally in the coming years indicate a strong increase in the demand for electricity, thermal energy for industry and fuel for transportation.

Consequently, these forecasts indicate a steady increase in the use of fossil fuels such as oil, coal and natural gas, especially by emerging, newly industrialized and developing countries. This consumption is in fact favored by the enormous availability of these resources and by the discovery of new fields and techniques for their extraction, factors which, on the whole, make these energy sources economically advantageous.

Using the data provided by these authoritative studies, not only is a decrease in $CO_2$ emissions globally not expected to counter global warming, but instead a substantial increase in emissions is expected over the next 50 years, mainly due to the increase in $CO_2$ emissions. world population and the new industrialization of entire countries.

The catastrophic effects of this situation on the climate are easy to understand and difficult to avoid especially because developing nations believe that the renewable energy option is too sophisticated and expensive and are oriented more towards short-term economic development programs rather than the containment of the $CO_2$ emissions and the environmental issues.

One of the most interesting energy carriers for the future decarbonization of the economy is represented by the $H_2$.

Different technologies have been proposed to be able to produce $H_2$ both by using the excess of renewable electricity through electrolytic processes and by using fossil fuels with $CO_2$ capture.

The production of $H_2$ through the use of fossil fuels such as natural gas through the Steam Methane Reforming process is very attractive due to its economy but the problem of storing the $CO_2$ emissions produced in the process remains.

Different technologies have been proposed to be able to capture and subsequently use or sequester the $CO_2$ produced by industrial and electricity generation plants in which fossil fuels are used.

In a known way, carbon capture and use technologies are commonly called CCU (Carbon Capture and Use).

The main proposed and known uses of the CCU are:
- the use of $CO_2$ for the production of vegetables in greenhouses or algae;
- the use of $CO_2$ for the production of carbonates also used in the construction sector;
- the use of $CO_2$ for the production of bicarbonates used in the agricultural, livestock, food and environmental sectors;
- the use of $CO_2$ in oil wells where it is injected to increase the oil production of the well itself with a technology called EOR (Enhanced Oil Recovery);
- the use of $CO_2$ in the food sector, in particular in carbonated drinks;
- the use of $CO_2$ in the chemical sector for the production of methanol and fuels in general, urea and fertilizers, carbon monoxide and methane;
- the use of $CO_2$ in fire extinguishers;
- use as a coolant or dry ice.

In a known way, carbon capture and storage technologies are commonly called CCS (Carbon Capture and Storage).

The main CCS (Carbon Capture and Sequestration) technologies proposed and known are:
- the sequestration of $CO_2$ in deep saline aquifers, a method recognized and promoted by the European Union through a specific directive of 2009;
- the sequestration of $CO_2$ directly in the ocean floor, in liquid form;
- the sequestration of $CO_2$ in calcium carbonates or calcium silicates, either directly or with the use of peptoids, known as Mineral Carbonation;
- the sequestration of $CO_2$ in oil wells where it is injected to increase the oil production of the well itself with a technology called EOR (enhanced oil recovery);
- the sequestration of $CO_2$ in the form of alkaline earth metal bicarbonates such as calcium and magnesium bicarbonate.

SUMMARY

Although there are various technological alternatives available, one of the most important problems still to be solved is the prohibitive cost of producing $H_2$ from fuels with the capture and permanent storage of the $CO_2$ produced to offer a truly decarbonised fuel to the market.

As can be immediately understood, there is a need to identify a technology that allows the production of $H_2$ to be achieved with simple technologies and to solve the problem of $CO_2$ storage at an acceptable cost.

The task of the present invention is to make available a method and a system that can allow the efficient generation of an $H_2$ from fuels and to produce a product that simultaneously represents a profitable use and, for certain uses, a possible permanent storage of $CO_2$ with lower costs than known technologies.

This object and these tasks are achieved by means of a system and a method for the production of $H_2$ and bicarbonate according to claim 1.

BRIEF DESCRIPTION OF THE FIGURES

In order to better understand the invention and appreciate its advantages, some exemplary and non-limiting embodiments thereof are described below, with reference to the attached drawings, in which:

the FIG. 1 is a schematic view of a plant for the production of hydrogen and bicarbonate according to the invention;

the FIG. 2 is a schematic view of a possible embodiment of the plant for the production of $H_2$ and bicarbonate according to the invention;

the FIG. 3 is a schematic view of a possible embodiment of the plant according to the invention;

the FIG. 4 is a schematic view of a possible embodiment of the plant according to the invention;

the FIG. 5 is a schematic view of a possible embodiment of the heat exchange apparatus according to the invention.

DETAILED DESCRIPTION OF THE EMBODIMENTS

In the description reference will also be made to "carbonic gas" meaning by this a mixture of gas containing mainly $CO_2$, and possibly other substances including $H_2$, CO, $CH_4$, $N_2$, $O_2$, $H_2S$, $SO_2$, NOx while when it is intended to refer only to chemical element $CO_2$ (carbon dioxide) $CO_2$ will be used in the description.

In the description reference will also be made to "insoluble" gases, meaning by this the set of gases that are not very soluble in water including $H_2$, CO, $CH_4$, $N_2$, Ar.

In the description will also refer to "water", meaning by this water in the liquid or vapor phase with the characteristics of salinity and temperatures necessary for use in the process according to the invention while when it is intended to refer only to the chemical element $H_2O$ in the description, we will use $H_2O$.

In the description, reference will also be made to the "sea", meaning by this the sea, the ocean or any brackish water containing a significant amount of NaCl, preferably higher than 10 g/l.

In the description reference will be made to the "carbonate", meaning by this a solid material consisting mainly of $CaCO_3$ and/or $MgCO_3$ in particle sizes ranging from a few microns to tens of millimeters even in aqueous suspension while when it is intended to refer only to the chemical element $CaCO_3$ or $MgCO_3$ in the description, $CaCO_3$ or $MgCO_3$ will be used respectively.

In the description will also refer to "calcium chloride" meaning by this a substance (solid or liquid) formed mainly by $CaCl_2$).

In the description reference will also be made to "sodium chloride" meaning by this a substance (solid or liquid) formed mainly by NaCl.

In the description reference will also be made to "potassium chloride" meaning by this a substance (solid or liquid) consisting mainly of KCl.

In the description reference will also be made to the "brine" meaning by this a concentrated solution of $H_2O$ and NaCl and/or KCl.

In the description will also refer to the "bicarbonate" meaning by this the chemical compounds $NaHCO_3$ and/or $KHCO_3$.

In the description, reference will also be made to the "solution", meaning by this a solution of water with $NaHCO_3$ and/or $KHCO_3$ bicarbonate.

In the description reference will be made to "bicarbonates" meaning by this the chemical compounds $Ca(HCO_3)_2$ and/or $Mg(HCO_3)_2$

In the description reference will be made to the "impurities" meaning by this the foreign substances present in the carbonate which do not take part in the chemical reactions in the reactor according to the invention.

In the description, reference will be made to the "mixture" by which we mean a mixture of water, carbonic gas, carbonate, bicarbonates and impurities in any proportion.

In the description reference will be made to the "pH", meaning by this the measurement scale that indicates the acidity or the basicity of a liquid which is defined by the following formula:

$$pH = -\log 10[H3O+]$$

In the description, reference will also be made to "ion exchange resins" meaning by this a polymeric matrix in which $Na^+$ and/or $K^+$ cations are trapped or incorporated, available for ion exchange with ions $Ca^{2+}$ and/or $Mg^{2+}$ present in the water according to the reaction $$Ca^{2+} + 2NaR \rightarrow CaR^{2+} + 2Na^+ \text{ [where R=resin]}$$

In the description reference will also be made to the "RO" (Reverse Osmosis), meaning by this the process that uses a partially permeable membrane in which the passage of the molecules of solvent from the more concentrated solution to the less concentrated solution obtained by applying to the more concentrated solution a pressure greater than the osmotic pressure.

In the description he will also refer to the "FO" (Forward Osmosis) meaning by this an osmotic process which, like the reverse osmosis (RO), uses a semipermeable membrane to carry out the separation of water from dissolved solutes. The driving force behind this separation is an osmotic pressure gradient generated by a highly concentrated "adsorption" solution relative to that of the feed solution which is used to induce a net flow of water across the membrane into the extraction solution, then separate effectively the feed water from its solutes.

In the description reference will also be made to "synthesis gas" or "syngas", meaning by this a mixture of gas containing mainly $CO_2$, CO, $H_2$, $CH_4$ in any proportion to the gaseous state and other substances including $N_2$, Ar, $O_2$, HC (hydrocarbons), HCO (oxygenated hydrocarbons), $H_2S$, $SO_2$, NOx and $H_2O$.

In the description reference will also be made to "hydrogen", meaning by this a gas containing mainly $H_2$ and other substances including CO, Ar, $CO_2$, $CH_4$, $N_2$ and $H_2O$ while when it is intended to refer only to the chemical element $H_2$ or to hydrogen with a purity higher than 99% $H_2$ will be used in the description.

In the description reference will also be made to "oxygen", meaning by this a mixture of gases containing mainly oxygen and other substances including $N_2$ and $H_2O$ in any proportion while when it is intended to refer only to the chemical element $O_2$ in the description, $O_2$ will be used. Atmospheric air falls under the definition of $O_2$ as a special case.

In the description reference will also be made to the "atmosphere", meaning by this any place in contact with atmospheric air.

In the description reference will also be made to "fuel" meaning any liquid, solid or gaseous substance containing carbon such as mineral coal, biomass, natural gas, petroleum, plastics.

In the description, reference will also be made to "ash" meaning the solid residue of the gasification process formed by both inorganic and carbonaceous material. The carbon residue in the ash can vary from 0% by weight to 99% by weight in the case of biochar.

In the description reference will also be made to the "gasifier" meaning any system, known per se, capable of generating a syngas starting from a fuel. For example, the gasifiers can be of the updraft, downdraft, cross draft, fluidized bed, mobile grate, rotary kiln, entrained, slagging, pyrolizers, Methane Reformers or gasifiers type that exploit solar energy.

In the description reference will be made to the "heat carrier" meaning a solid material with variable grain size between 0.1 mm and 100 mm, preferably between 1 mm and 25 mm with good heat capacity, density, hardness, abrasion resistance, resistance to high temperatures and thermal shocks. Among the materials suitable to be heat carriers we can mention metals such as stainless steel and nickel, ceramics such as ground bauxite, corundum and tabular alumina and natural rocks such as olivine (Mg, Fe) $2SiO_4$.

In the description reference will also be made to the "purifier" meaning any system, known per se, capable of separating the $H_2$ present in a gaseous flow. The operation of the purifier can be based on any physical and/or chemical principle useful for the purpose of separating the different gases. It can, for example, consist of membranes, absorption systems (pressure/temperature swing adsorption—PSA/TSA), etc.

In the description reference will also be made to "chemical products" which are useful, meaning by this, one or more raw materials that can be used in industry, for example methanol, ethanol, ammonia ($NH_3$) and synthetic fuels, or synfuels, produced by Fischer-Tropsch conversion.

In the description, reference will also be made to the "gaseous residue", commonly called "tail gas", meaning by this a mixture of gas containing mainly $CO_2$, CO, Ar, $H_2$, $H_2O$ $N_2$, $CH_4$ in any proportion leaving the purifier. The tail gas can be used in processes external to the process according to the invention or be suitably reused in the processes of the system according to the invention.

In the description reference will also be made to the "reformer" meaning any system, per se known, capable of catalytically or thermally reforming hydrocarbons, including $CH_4$ and tars. For example, the reformer can be of the steam methane reformer—SMR type or of the autothermal reformer—ATR type.

In the description reference will also be made to "high temperature", meaning by this a temperature greater than 600° C.

In the description reference will also be made to "low temperature", thus meaning a temperature between 60° C. and 600° C.

In the description reference will also be made to the "ambient temperature", meaning by this a temperature lower than 60° C.

In the description reference will be made to "inclined", meaning by this an arrangement of the apparatus in question in which its axis forms an angle between 0° and 90° with respect to the horizontal.

In the attached figures, the reference 100 generally indicates the plant according to the invention.

Figure 1:
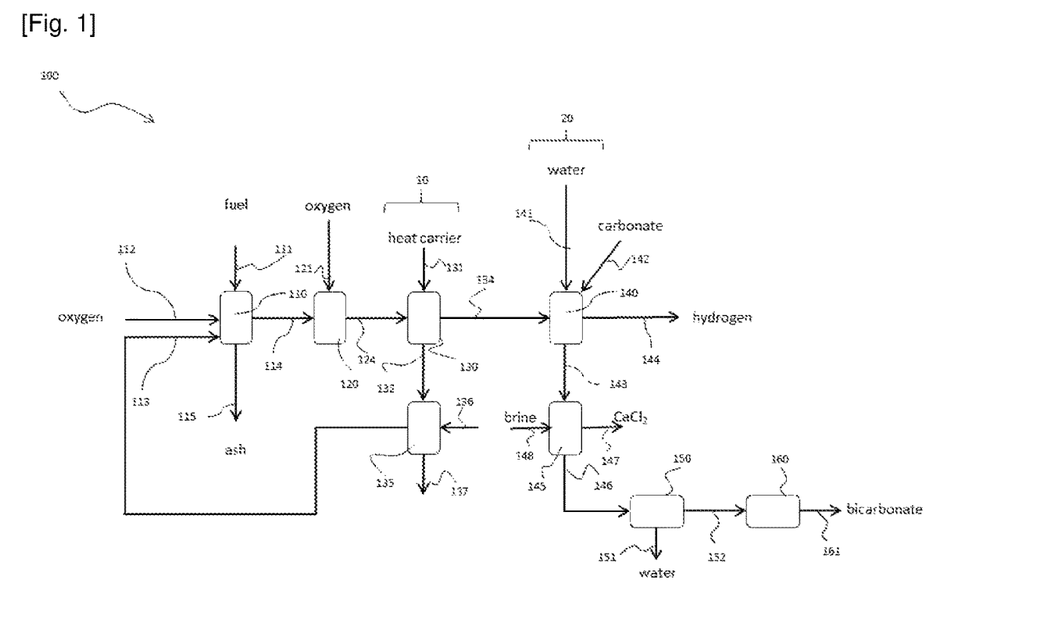

A first aspect of the invention relates to a plant 100 for the production of $H_2$ and bicarbonate. Referring to FIG. 1, the plant 100 comprises a gasifier 110, a reformer 120, an apparatus 10 for the heat exchange in which the syngas is cooled and in which superheated steam is produced, an apparatus 20 for the capture of $CO_2$ and for the production of bicarbonate in which:

the gasifier 110 is suitable for receiving a fuel 111 at its inlet, it is suitable for receiving a steam flow 113 at its inlet, it is an oxygen flow 112 and producing a high temperature syngas flow 114 and an ash flow 115 at the outlet;

The reformer 120 is suitable for receiving at the inlet the high temperature syngas stream 114 produced by the gasifier 110, the oxygen stream 121, is suitable for catalytically or thermally reforming the hydrocarbons present in the syngas and is suitable for releasing a stream of syngas 124 at high temperature;

the apparatus 10 for the heat exchange 10 comprises a direct contact heat exchanger 130 and a direct contact heat exchanger 135;

the direct contact heat exchanger 130 is suitable for receiving the high temperature syngas flow 124 produced by the reformer 120, the low temperature heat carrier flow 131 and releasing at the outlet a flow of syngas 134 at a lower temperature and a flow high temperature heat carrier 132;

the direct contact heat exchanger 135 is suitable for receiving the water flow 136 and the high temperature heat carrier flow 132 at the inlet and releasing the superheated steam 113 and the low temperature heat carrier flow 137;

the apparatus 20 for capturing $CO_2$ and producing bicarbonate comprises a mixer 140 and an apparatus 145 for ion exchange, a concentrator 150 for concentrating the mixture rich in bicarbonate and a dryer 160;

the mixer 140 is suitable for receiving the syngas flow at room temperature 134, the $H_2O$ flow 141, the carbonate flow 142, and for releasing the mixture 143 and the hydrogen 144 at the outlet;

the ion exchange apparatus 145 is suitable for receiving the mixture 143 at the inlet, the brine flow 148 and releasing at the outlet a flow of $CaCl_2$) 147 and a solution of water and bicarbonate 146;

the osmosis concentrator 150 is suitable for receiving the water and bicarbonate solution 146 at the inlet and for releasing the water flow 151 and the concentrated bicarbonate solution 152 at the outlet;

the dryer 160 is suitable for receiving the concentrated bicarbonate solution 152 at the inlet and releasing at least the flow of bicarbonate in the solid state 161 at the outlet.

Figure 2:
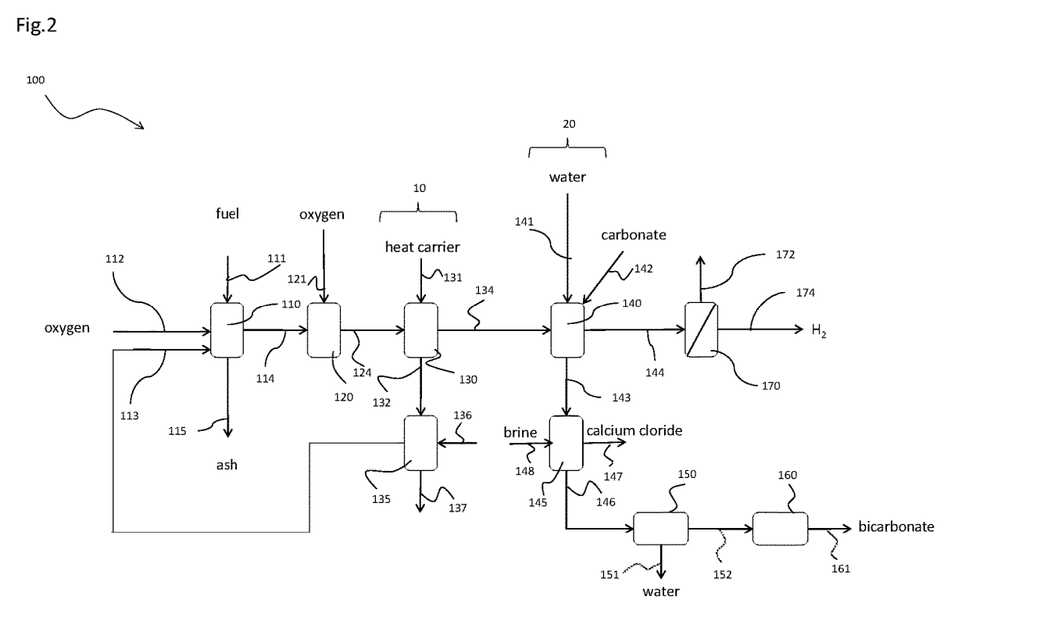
Figure 3:
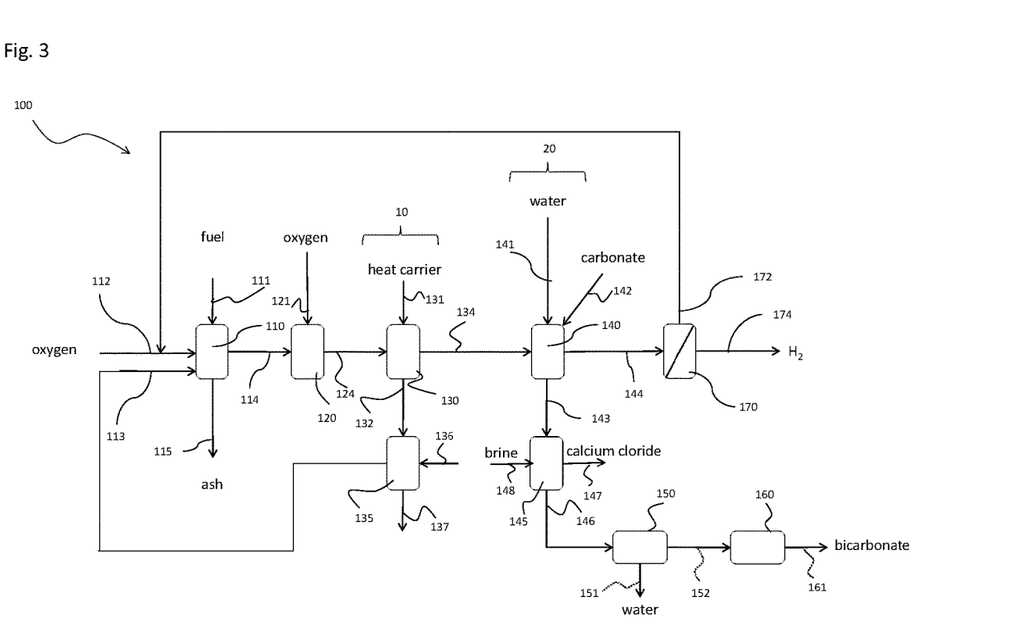

In accordance with an embodiment of the plant 100 and with reference to FIGS. 2 and 3, the plant 100 comprises a purifier 170 in which:

the purifier 170 is suitable for receiving the hydrogen flow 144 at the inlet and treating it so as to make at least the $H_2$ 174 available separately in addition to the tail gas 172.

In accordance with an embodiment of the plant 100 and with reference to FIG. 2, the tail gas 172 leaving the purifier 170 is sent to the gasifier 110 which is suitable for receiving a flow of tail gas 172 at its inlet and for oxidizing it.

In accordance with an embodiment of the plant 100 and with reference to FIG. 3, the tail gas 172 leaving the purifier

170 is sent to the reformer 120 which is suitable for receiving a flow of tail gas 172 at its inlet and for oxidizing it.

A second aspect of the invention relates to a method for the generation of hydrogen and bicarbonate. The method according to the invention comprises the following steps:

providing a gasifier 110;
feeding a fuel 111 to the gasifier 110 so as to obtain a high temperature syngas flow 114;
conveying the flow of high temperature syngas 114;
providing a reformer 120 between the gasifier 110 and the direct contact heat exchanger 130;
feeding to the reformer 120 the high temperature syngas stream 114 produced by the gasifier 110;
catalytically or thermally reforming the hydrocarbons present in the syngas 114; and
releasing an $H_2$-enriched high-temperature syngas stream from the reformer 120;
providing an apparatus 10 for heat exchange;
supplying a low temperature heat carrier 131 to the direct contact heat exchanger 130;
feeding the high temperature syngas flow 114 to the direct contact heat exchanger 130 so as to obtain a heat exchange with the heat carrier 131 and a low temperature gas flow 134;
feeding the water flow 133 to the direct contact heat exchanger 135 so as to obtain a heat exchange with the high temperature heat carrier 132 and a stream of superheated steam 113;
conveying the gas flow 134;
preparing an apparatus for the capture and production of bicarbonate 20;
feeding the $CO_2$-enriched gas flow 134, the carbonate flow 142 and the water flow 141 to the mixer 140 to obtain the mixture flow 143 at the outlet;
conveying the mixture flow 143;
feeding the mixture flow 143 and the brine flow 148 to the ion exchange apparatus 145 to obtain at the outlet the $CaCl_2$ flow 147 and the water and bicarbonate solution flow 146;
conveying the solution 146;
feeding the solution 146 to the concentrator 150 to obtain at the outlet the flow of water 151 and the flow of concentrated solution 152;
conveying the concentrated solution 152;
feeding the concentrated solution 152 to the dryer 160 to obtain at least one flow of bicarbonate in the solid state 161 at the outlet;

In accordance with an embodiment, the method further comprises the steps of:— conveying the hydrogen 144;
feeding the hydrogen 144 to the purifier 170 to obtain at the outlet the flow of $H_2$ 174 and a flow of tail gas 172;
conveying the tail gas 172;
supplying the gasifier 110 and/or the reformer 120 with the tail gas 172.

With reference to FIGS. 1,2,3 and 4, it can be seen that the gasifier 110 is fed with the fuel 111 together with the necessary quantities of oxygen 112 and water 113 for the production, in a per se known manner, of syngas 114. The syngas 114 leaving the gasifier 110 can reach a temperature preferably between 600° C. and 1300° C. The ash 115 is also evacuated from the gasifier 110.

The high temperature syngas leaving the gasifier 110 is sent to a reformer 120 where a minimum residence time is guaranteed for the syngas, preferably between 1 s and 5 s, of the syngas at the desired temperature, preferably between 800° C. and 1300° C.

If the temperature of the syngas 114 that feeds the reformer 120 is lower than the desired temperature for the reforming process of the hydrocarbons and tars, it is increased by the oxidation of a part of the syngas due to the injection of $O_2$ 122 into the reformer 120.

The enthalpy of the high temperature syngas 121 leaving the reformer 120 is used by the apparatus 10 to evaporate the water 133 and superheat the steam 113 necessary for the gasification process.

The suitably cooled and possibly dedusted syngas 134 can be sent to the apparatus 20 in which the $CO_2$ contained therein reacts with the water and the carbonates to form a mixture of water and bicarbonates.

Still referring to the embodiment of FIG. 2, the plant 100 according to the invention comprises a purifier 170 in order to be able to separate at least the $H_2$ 174 from the hydrogen 144 releasing a tail gas 172.

The $H_2$ produced with the process according to the invention is made available for various civil and industrial uses. Once placed on the market, it can replace fossil fuels such as natural gas, for example in electricity generation, or it can be used instead of $H_2$ produced using natural gas, for example with Steam Methane Reformer—SMR for industrial processes such as the production of $NH_3$ or the refining of hydrocarbons.

As the expert may well understand, $H_2$ can be easily sold on the market both as hydrogen for chemical processes and, in the most conservative case, as an energy carrier with the same value as traditional energy carriers such as natural gas.

With reference to the embodiment of FIG. 3, the plant 100 according to the invention can comprise the recirculation of the tail gas 172 to the gasifier 110 where, in the presence of oxygen 112, it can be conveniently oxidized, generating useful heat for the gasification process same.

As the skilled person can well understand, the oxidation of the tail gas 172 mainly produces $CO_2$ and $H_2O$ at high temperature which, by mixing with the syngas inside the gasifier 110, help to provide the heat necessary for the endothermic gasification reactions thus avoiding oxidize some syngas or fuel to provide the necessary heat.

Figure 4:
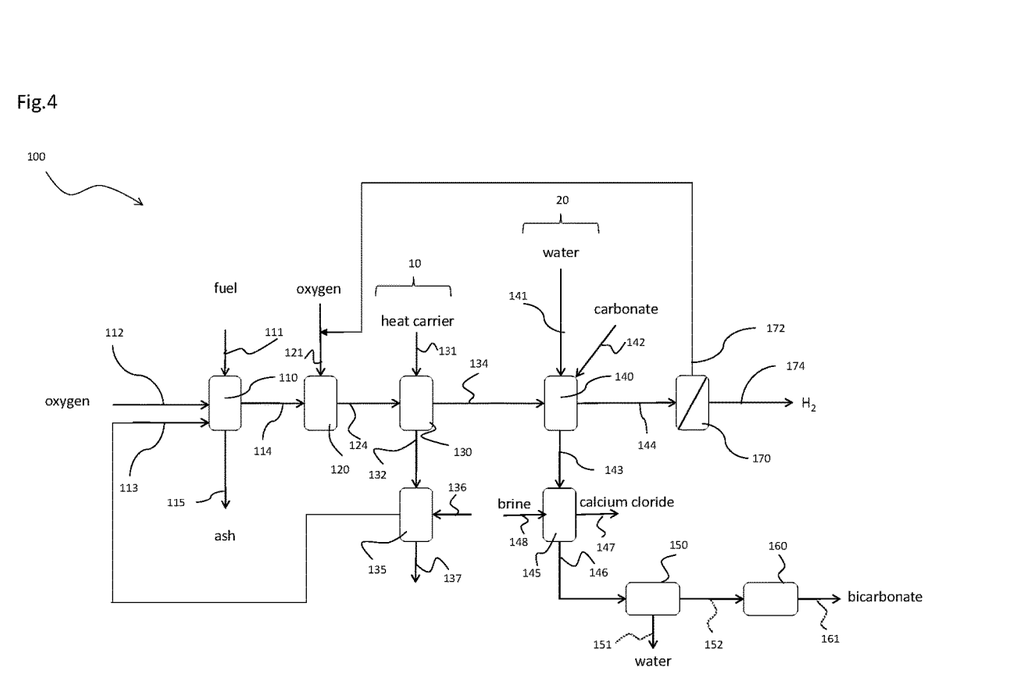

With reference to the embodiment of FIG. 4, the plant 100 according to the invention can comprise the recirculation of the tail gas 172 to the reformer 120 where, in the presence of oxygen 122, it can be conveniently oxidized, generating useful heat for the reforming process of tars.

Figure 5:
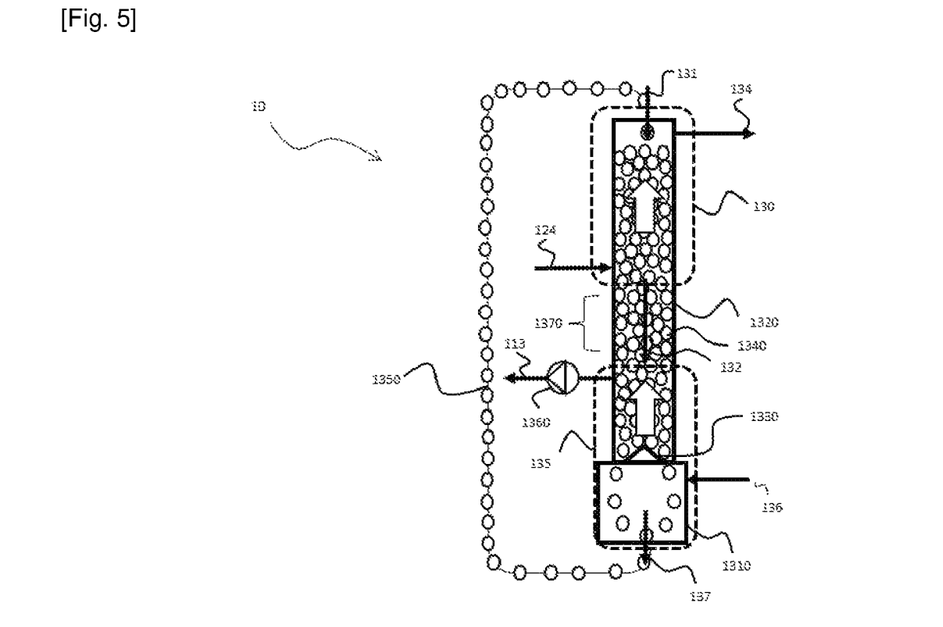

With reference to the embodiment of FIG. 5, the apparatus 10 according to the invention can comprise an inclined adiabatic tube 1320, a tank 1310 for the evaporation of water 136, the heat carrier 1340, a system for the recirculation of the '1350 heat carrier and 1360 high temperature vacuum.

Still referring to the embodiment of FIG. 4, the apparatus 10 according to the invention can also comprise a system 1330 for the controlled discharge of the heat carrier 1340 from the tube 1320 to the tank 1310.

The adiabatic inclined tube 1320 can be static or rotating and preferably have an inclination between 0° and 90° with respect to the vertical.

According to a particular embodiment of the apparatus 10, the inclined tube 1320 can be replaced by two or more rotating tubes such as for example rotary kilns or "rotary kilns".

As the skilled person can well understand, the high temperature syngas flow 121, preferably between 1000° C. and 1300° C., which enters the direct contact heat exchanger 130, passing through the heat carrier 1340 in countercurrent, is cooled while the heat carrier is heated. The syngas 134 which leaves the direct contact heat exchanger 130 is at a temperature between 20° C. and 500° C., preferably between 100° C. and 300° C. The flow of heat carrier 131 entering the direct contact heat exchanger 130 is at a lower temperature than that of the syngas 134, preferably between 0° C. and 300° C., leaving the direct contact heat exchanger 130.

As the skilled person may well understand, the heat carrier flow 132 leaving the direct contact heat exchanger 130 has a lower temperature, preferably between 900° C. and 1200° C., than that of the syngas 121 entering the direct contact heat exchanger 130.

The conduit 1370 hydraulically connects the direct contact heat exchanger 130 with the direct contact heat exchanger 135 and is suitable for the passage of high temperature heat carriers.

As the skilled person may well understand, the flow of heat carrier 132 which enters the direct contact heat exchanger 135 via conduit 1370 and which is crossed in countercurrent by the flow of $H_2O$ 133 is cooled while the flow of $H_2O$ 133 is heated at a temperature preferably between 900° C. and 1200° C.

As the skilled person can well understand, the flow 113 of $H_2O$ at high temperature allows the gasification reactions in the gasifier 110 and the production of syngas with a high content of $H_2$, preferably between 40% and 60% by volume.

According to a particular embodiment of the apparatus 10, to avoid leakage of $H_2O$ at high temperature or syngas between the direct contact heat exchangers 130 and 135 through the duct 1370, a high temperature aspirator 1360 is provided which has the function of balancing the pressures in the two direct contact heat exchangers 130 and 135.

The high temperature extractor 1360 may be a centrifugal, axial fan or an ejector in the known manner.

According to a particular embodiment of the apparatus 10, between the tank 1310 and the body 1320 of the apparatus 10, a device 1330 for the controlled discharge of the heat carrier at low temperature is installed.

According to a particular embodiment of the apparatus 10, between the direct contact heat exchanger 130 and the direct contact heat exchanger 135, a device for transporting and recirculating the heat carrier 136 at low temperature which comes from the tank 1310 and is conveyed 131 into the direct contact heat exchanger 130 is installed.

With reference to the embodiment of FIG. 1, 2, 3 or 4, the apparatus 20 according to the invention comprises the mixer 140.

In known form, water and carbonate are used as means to absorb $CO_2$ from the stream of a gas containing $CO_2$ and form the mixture of bicarbonates 143 according to the reaction:

$$CO_2\,(g) + CaCO_3\,(s) + H_2O \Rightarrow Ca^{2+}_{(aq)} + 2HCO_3^-_{(aq)} \qquad [1]$$

A skilled person can easily understand that the composition of the mixture 143 released by the mixer 140 may contain impurities which are conveniently filtered from the mixture 143 by means of suitable filters (not shown in the figure) placed between the mixer 140 and the ion exchange apparatus 145.

In the known form, the mixture 143 can be treated by an ion exchange apparatus 145 which allows the replacement of the $Ca^{2+}$ ions with the $Na^+$ or $K^+$ ions generating a solution 146 of water and sodium or potassium bicarbonate.

In per se known form, the bicarbonate solution 146 can be concentrated by the use of a RO or FO osmosis concentrator 150.

In per se known form, the concentrated bicarbonate solution 152 can be dried in a low temperature dryer 160 which can be of the "vacuum spray dryer" type.

In a known form, sodium bicarbonate decomposes into $CO_2$ and $Na_2CO_3$ with temperatures above 50° C.

As the skilled person can well conclude, the method and the plant according to the invention allow to generate $H_2$ and bicarbonate which can be conveniently used while simultaneously representing a CCU (Carbon Capture and Utilization) and a CCS (Carbon Capture and Storage). It is thus possible to overcome one of the most important technical/economic obstacles for the diffusion of plants for the generation of decarbonised $H_2$.

It is clear that the specific characteristics are described in relation to different embodiments of the plant and of the method with an illustrative and non-limiting intent. Obviously, a person skilled in the art, in order to satisfy contingent and specific needs, may make further modifications and variations to the plant and method according to the present invention, all of which are however contained within the scope of protection of the invention, as defined by the following claims.

The invention claimed is:

1. A plant for the production of $H_2$ and bicarbonate comprising: a gasifier, a reformer, an apparatus for the exchange of heat in which the syngas is cooled and in which superheated steam is produced, an apparatus for the capture of $CO_2$ and for the production of bicarbonate, wherein:

the gasifier is configured to receive a fuel at its input, receive a steam flow, and an oxygen flow, and produce a high temperature syngas flow at its output and an ash flow;

the reformer is configured to receive the high temperature syngas flow produced by the gasifier, the oxygen flow, configured for a catalytic or thermal reformation of the hydrocarbons present in the syngas and is configured to release a high temperature syngas flow;

the apparatus for heat exchange comprising a first direct contact heat exchanger and a second direct contact heat exchanger;

the first direct contact heat exchanger is configured to receive the high temperature syngas flow produced by the reformer, the low temperature heat carrier flow and release a syngas flow at lower temperature and a heat carrier flow at high temperature;

the second direct contact heat exchanger is configured to receive the water flow and the high temperature heat carrier flow and release the superheated steam and the heat carrier flow at low temperature;

the apparatus for $CO_2$ capture and bicarbonate production includes a mixer and an ion exchange apparatus, an osmosis concentrator for the concentration of the bicarbonate rich solution, and a dryer;

the mixer is configured to receive the low temperature syngas flow, the $H_2O$ flow, the carbonate flow and to release a mixture and a flow of hydrogen;

the ion exchange apparatus is configured to receive the mixture, a flow of brine at the input and release a flow of $CaCl_2$) and a solution of water and bicarbonate;

the osmosis concentrator is configured to receive the water and bicarbonate solution at the input and to release the water flow and the concentrated bicarbonate solution; and the dryer is configured to receive the concentrated bicarbonate solution at the input and to release at least the solid bicarbonate flow.

2. The plant according to claim 1, further comprising a purifier, wherein:
the purifier is configured to receive the hydrogen flow at the input and to treat it so as to make available at least $H_2$ separately in addition to the tail gas.

3. The plant according to claim 2 wherein:
the tail gas leaving the purifier is sent to the gasifier which is configured to receive a tail gas flow and oxidize the tail gas.

4. The plant according to claim 2 wherein:
the tail gas leaving the purifier is sent to the reformer is configured to receive a tail gas flow and oxidizing the tail gas.

5. A method for the generation of hydrogen and bicarbonate, comprising:
preparing a gasifier;
providing an apparatus for heat exchange comprising a first direct contact heat exchanger and a second direct contact heat exchanger;
feeding a fuel to the gasifier to obtain a high temperature syngas flow;
conveying the syngas flow at high temperature;
providing a reformer between the gasifier and the first direct contact heat exchanger;
feeding the reformer with the high temperature syngas flow produced by the gasifier;
catalytically or thermally reforming the hydrocarbons present in the syngas;
releasing a stream of $H_2$-enriched high temperature syngas at the exit from the reformer;
supplying a low temperature heat carrier to the first direct contact heat exchanger;
feeding the high temperature syngas flow to the first direct contact heat exchanger to obtain a heat exchange with the heat carrier and a low temperature gas flow;
feeding the $H_2O$ flow to the second direct contact heat exchanger to obtain a heat exchange with the high temperature heat carrier and a superheated steam flow;
conveying the gas flow;
preparing an apparatus for the capture and production of bicarbonate;
feeding the $CO_2$-enriched gas flow, the carbonate flow and the water flow to the mixer to obtain a mixture and hydrogen;
conveying the mixture;
feeding the flow of mixture and a brine to the apparatus for ion exchange to obtain the flow of $CaCl_2$ and the solution of water and bicarbonate;
conveying the solution;
providing a concentrator;
feeding the solution to the concentrator to obtain the flow of water and the flow of concentrated solution;
conveying the concentrated solution; and
feeding the concentrated solution to the dryer to get at least one flow of bicarbonate in the solid state.

6. The method of claim 5, further comprising:
conveying the hydrogen;
providing a purifier;
feeding the hydrogen to the purifier to obtain the $H_2$ flow and a tail gas flow;
conveying the tail gas; and
feeding the gasifier with the tail gas.

7. The method of claim 5, further comprising:
conveying the hydrogen;
providing a purifier;
feeding the hydrogen to the purifier to obtain the $H_2$ flow and a tail gas flow;
conveying the tail gas; and
feeding the reformer with the tail gas.

* * * * *